US005548746A

United States Patent [19]
Carpenter et al.

[11] Patent Number: 5,548,746
[45] Date of Patent: Aug. 20, 1996

[54] NON-CONTIGUOUS MAPPING OF I/O ADDRESSES TO USE PAGE PROTECTION OF A PROCESS

[75] Inventors: Gary D. Carpenter, Pflugerville; Mark E. Dean, Austin, both of Tex.; Marc R. Faucher, South Burlington, Vt.; James C. Peterson; Howard C. Tanner, both of Austin, Tex.

[73] Assignee: International Business Machines Corporation, Armonk, N.Y.

[21] Appl. No.: 158,059

[22] Filed: Nov. 12, 1993

[51] Int. Cl.⁶ .................................. G06F 3/00; G06F 9/26
[52] U.S. Cl. ...................... 395/500; 395/412; 395/416; 395/442; 395/418; 395/700; 395/490; 364/DIG. 1; 364/DIG. 2; 380/4; 380/49
[58] Field of Search ................................ 395/500, 115, 395/166, 425, 375, 775, 400, 725, 800, 420, 421.06, 418, 410–412, 497.01, 421.02, 479, 416, 490, 846, 306, 431, 842, 727, 162, 164, 442, 488, 250, 419, 402; 364/DIG. 1, DIG. 2; 380/4, 49

[56] References Cited

U.S. PATENT DOCUMENTS

| | | | |
|---|---|---|---|
| 4,035,779 | 7/1977 | Birney et al. | 395/431 |
| 4,037,207 | 7/1977 | Birney et al. | 395/725 |
| 4,037,214 | 7/1977 | Birney et al. | 395/416 |
| 4,037,215 | 7/1977 | Birney et al. | 395/425 |
| 4,038,645 | 7/1977 | Birney et al. | 395/416 |
| 4,042,913 | 8/1977 | Birney et al. | 395/375 |
| 4,050,060 | 9/1977 | Birney et al. | 395/425 |
| 4,285,040 | 8/1981 | Carlson et al. | 395/416 |
| 4,315,310 | 2/1982 | Bayliss et al. | 395/823 |
| 4,340,932 | 7/1982 | Bakula et al. | 395/402 |
| 4,355,355 | 10/1982 | Butwell et al. | 395/418 |
| 4,407,016 | 9/1983 | Bayliss et al. | 395/823 |
| 4,446,517 | 5/1984 | Katsura et al. | 395/375 |
| 4,649,471 | 3/1987 | Briggs et al. | 395/421.01 |
| 4,677,544 | 6/1987 | Kinoshita | 395/425 |
| 4,677,546 | 6/1987 | Freeman et al. | 395/425 |
| 4,736,290 | 4/1988 | McCallion | 395/412 |
| 4,761,736 | 8/1988 | Di Orio | 395/419 |
| 4,761,737 | 8/1988 | Duvall et al. | 395/419 |
| 4,797,853 | 1/1989 | Savage et al. | 395/842 |
| 4,809,217 | 2/1989 | Floro et al. | 395/872 |
| 4,843,541 | 6/1989 | Bean et al. | 395/856 |
| 4,847,750 | 7/1989 | Daniel | 395/846 |
| 4,849,875 | 7/1989 | Fairman et al. | 395/846 |

(List continued on next page.)

FOREIGN PATENT DOCUMENTS

| | | |
|---|---|---|
| 585117 | 3/1994 | European Pat. Off. . |
| 04-021059 | 1/1992 | Japan . |
| 2176918A | 1/1987 | United Kingdom . |
| 8806761 | 9/1988 | WIPO . |
| 93/22726 | 11/1993 | WIPO . |

OTHER PUBLICATIONS

*PowerPC 601 Risc Microprocessor Users Manual MPC 601 UM/AD*, Chapter 6, Section 6.1, pp. 6–2 through 6–8. Jan. 1993.

*PCI Local Bus*, Revision 2.0, Apr. 30 1993, "PCI Local Bus Specification", pp. 1–198.

IBM TDB, "Memory Map Protection Circuit", vol. 29, No. 11, Apr. 1987, pp. 4971–4975.

*Primary Examiner*—Kevin J. Teska
*Assistant Examiner*—Jacques H. Louis-Jacques
*Attorney, Agent, or Firm*—Casimer K. Salys

[57] ABSTRACT

A system and method for protecting individual segments of a contiguous I/O address space on a system bus using the page access protection resources of a processor operating on a processor bus address space. The contiguous I/O address space is segmented and mapped by translation into the processor address space by distributing I/O segments non-contiguously among successive processor bus pages. Individual I/O address space segments, as may be associated with I/O ports, are protected directly by the processor through the selective enablement of page protection for correspondingly mapped ports.

12 Claims, 5 Drawing Sheets

U.S. PATENT DOCUMENTS

| | | | |
|---|---|---|---|
| 4,864,532 | 9/1989 | Reeve et al. | 395/250 |
| 4,926,322 | 5/1990 | Stimac et al. | 395/500 |
| 4,942,541 | 7/1990 | Hoel et al. | 395/115 |
| 5,023,773 | 6/1991 | Baum et al. | 395/727 |
| 5,083,259 | 1/1992 | Maresh et al. | 395/306 |
| 5,091,846 | 2/1992 | Sachs et al. | 395/250 |
| 5,253,308 | 10/1993 | Johnson | 395/800 |
| 5,280,579 | 1/1994 | Nye | 395/166 |
| 5,293,593 | 3/1994 | Hodge et al. | 395/412 |
| 5,341,494 | 8/1994 | Thayer et al. | 395/442 |
| 5,381,537 | 1/1995 | Baum et al. | 395/416 |

| PROCESSOR BUS ADDRESS | | | PCI/SYSTEM BUS ADDRESS (I/O CYCLES) | | |
|---|---|---|---|---|---|
| A31 | (LSB) | -> | A/D | 0* | (LSB) |
| 30 | | -> | | 1* | |
| 29 | | -> | | 2* | |
| 28 | | -> | | 3 | |
| 27 | | -> | A/D | 4 | |
| 26 | IGNORED | | | | |
| 25 | IGNORED | | | | |
| 24 | IGNORED | | | | |
| 23 | IGNORED | | | | |
| 22 | IGNORED | | | | |
| 21 | IGNORED | | | | |
| 20 | IGNORED | | | | |
| 19 | | -> | A/D | 5 | |
| 18 | | -> | | 6 | |
| 17 | | -> | | 7 | |
| 16 | | -> | | 8 | |
| 15 | | -> | | 9 | |
| 14 | | -> | | 10 | |
| 13 | | -> | | 11 | |
| 12 | | -> | | 12 | |
| 11 | | -> | | 13 | |
| 10 | | -> | | 14 | |
| 9 | | -> | | 15 | |
| 8 | | -> | | 16 | = 0 |
| 7 | | -> | | 17 | = 0 |
| 6 | | -> | | 18 | = 0 |
| 5 | | -> | | 19 | = 0 |
| 4 | | -> | | 20 | = 0 |
| 3 | | -> | | 21 | = 0 |
| 2 | | -> | | 22 | = 0 |
| 1 | | -> | A/D | 23 | = 0 |
| 0 | (MSB) | ----- | | 24 | = 0 |
| - | | ----- | | 25 | = 0 |
| - | | ----- | | 26 | = 0 |
| - | | ----- | | 27 | = 0 |
| - | | ----- | | 28 | = 0 |
| - | | ----- | | 29 | = 0 |
| - | | ----- | | 30 | = 0 |
| - | | ----- | A/D | 31 | (MSB) = 0 |

64K ISA BUS ADDRESSES (bracket spanning PCI addresses 0–15)

FIG. 2

|  ISA I/O ADDRESS | PROCESSOR ADDRESS |
|---|---|
| 0000 | 8000 0000 |
| 0001 | 8000 0001 |
| 0002 | 8000 0002 |
| ⋮ | ⋮ |
| 001E | 8000 001E |
| 001F | 8000 001F |

4K PAGE ← (first block)

PROCESSOR ADDRESSES 8000 0020 TO 8000 0FFF ARE WRAPPED AND SHOULD NOT BE USED.

| 0020 | 8000 1000 |
| 0021 | 8000 1001 |
| ⋮ | ⋮ |

4K PAGE ← (second block)

FIG. 3

NON-CONTIGUOUS MAPPING OF I/O ADDRESSES TO USE PAGE PROTECTION OF A PROCESS

BACKGROUND OF THE INVENTION

The present invention relates generally to computer architectures. More particularly, the present invention is directed to systems and methods for protecting address space through controlled mapping and the address protection resources in a processor.

Conventionally available personal computers do not provide resources by which an operating system can protect designated address space. This lack of selective protection exposes systems having directly mapped input/output (I/O) devices to unintended or malicious code initiated read or write operations. As the number of I/O devices increases, and with multitasking systems and network environments, the importance of protecting address space becomes a subject of greater concern.

Some advanced workstations and computer systems employ RAM based techniques to control access into I/O address space. The prevailing approach involves the use of a table in memory which is consulted to determine whether the code seeking access to the specified address space has the requisite authority. This approach provides protection to the I/O address space, but is costly in terms of memory and is slow in speed as a consequence of the comparisons that must be performed.

Advanced processors, such as the PowerPC 601 (trademark of IBM Corporation) RISC processor available from IBM Corporation provide inherent memory protection resources. For example, in the case of the PowerPC 601 processor, the memory management unit provides selectively enabled protection to the processor address space enforceable at a block or page level. The access protection is selectable in varying options including read/write operation or user/supervisor levels. The details of the capabilities are described in the PowerPC 601 RISC Microprocessor Users Manual MPC 601UM/AD. However, as noted above, the protection is invocable at the aforementioned block or page level.

The distribution of address space for computer system level functions such as I/O are in most cases contiguous. Given the high speed of contemporary processors, the I/O devices, memory and other peripherals within the processor address space are physically attached to buses which are distinct from, but coupled by interface to, the bus upon which the processor itself resides. Of those system type buses conventionally in use, the Industry Standard Architecture (ISA) or Extended Industry Standard Architecture (EISA) are the best known. Another well known system level bus for connecting I/O devices is the Microchannel bus (trademark of IBM Corporation). A relatively new bus architecture which has drawn significant attention is known as the Peripheral Component Interconnect (PCI) bus, with the design details being defined in the PCI Local Bus Specification as distributed by the PCI Special Interest Group. Given the tremendous span in performance difference between the processor bus and the ISA or EISA buses used for I/O devices, the PCI bus has proven to be a valuable intermediate performance level bus for contemporary computer architectures.

Irrespective of the bus architecture selected for the I/O devices, there remains a need for selectively controlling access to segments from within the band of contiguous PCI, ISA or EISA address space assigned to I/O devices. The protection should provide operating system selectivity by I/O segments while minimizing comparison delays of the like previously used to protect I/O address space.

SUMMARY OF THE INVENTION

The present invention provides systems and methods for protecting computer address space using page or block access protection resources of advanced processors. In one form, the invention is directed to a computer address space protection system comprising a processor means for selectively inhibiting access to bands of processor address space and means for translating non-contiguous segments of processor address space to a contiguous band of system bus address space. In another form, the invention relates to a method of protecting a band of system address space in a computer, comprising the steps of operating a processor with processor address space in a page or block protective mode, and translating non-contiguous segments of the processor address space to a band of system address space.

According to a preferred embodiment of the invention, I/O device (port) addresses are assigned (memory mapped) to individual memory pages of a processor having access protection by page. Processor address space is selectively protected by page using operating system software. Since the processor manages the program instructions, access protection of processor address space pages correspondingly protects I/O address space which is mapped to the protected processor pages at the speed of the processor. Preferably, the contiguous I/O address space is segmented and distributed in non-contiguous portions to the low addresses of successive pages within the processor address space. Thereby, a mapped protection of I/O address space by segment is defined and initiated using processor page protection.

These and other features of the invention will be more clearly understood and appreciated upon considering the detailed description which follows hereinafter.

BRIEF DESCRIPTION OF THE DRAWINGS

FIG. 2 schematically illustrates the address mapping by bit position.

FIG. 3 schematically illustrates port address conversion.

DESCRIPTION OF THE PREFERRED EMBODIMENT

The present invention as preferably embodied is directed to the selective and individualized protection of segments from within a contiguous I/O address space as exists on a PCI bus using page or block level processor address space access protection as provided in a PowerPC 601 processor or the like. This system and method permits high speed addressing, in that comparisons to tables of protected memory addresses are avoided, while using resource inherent in the processor. Individual segments of the normally contiguous I/O address space are protected with the enablement of individual page protection in the processor. The segments are mapped to individual pages of the processor address space.

Figure 1:
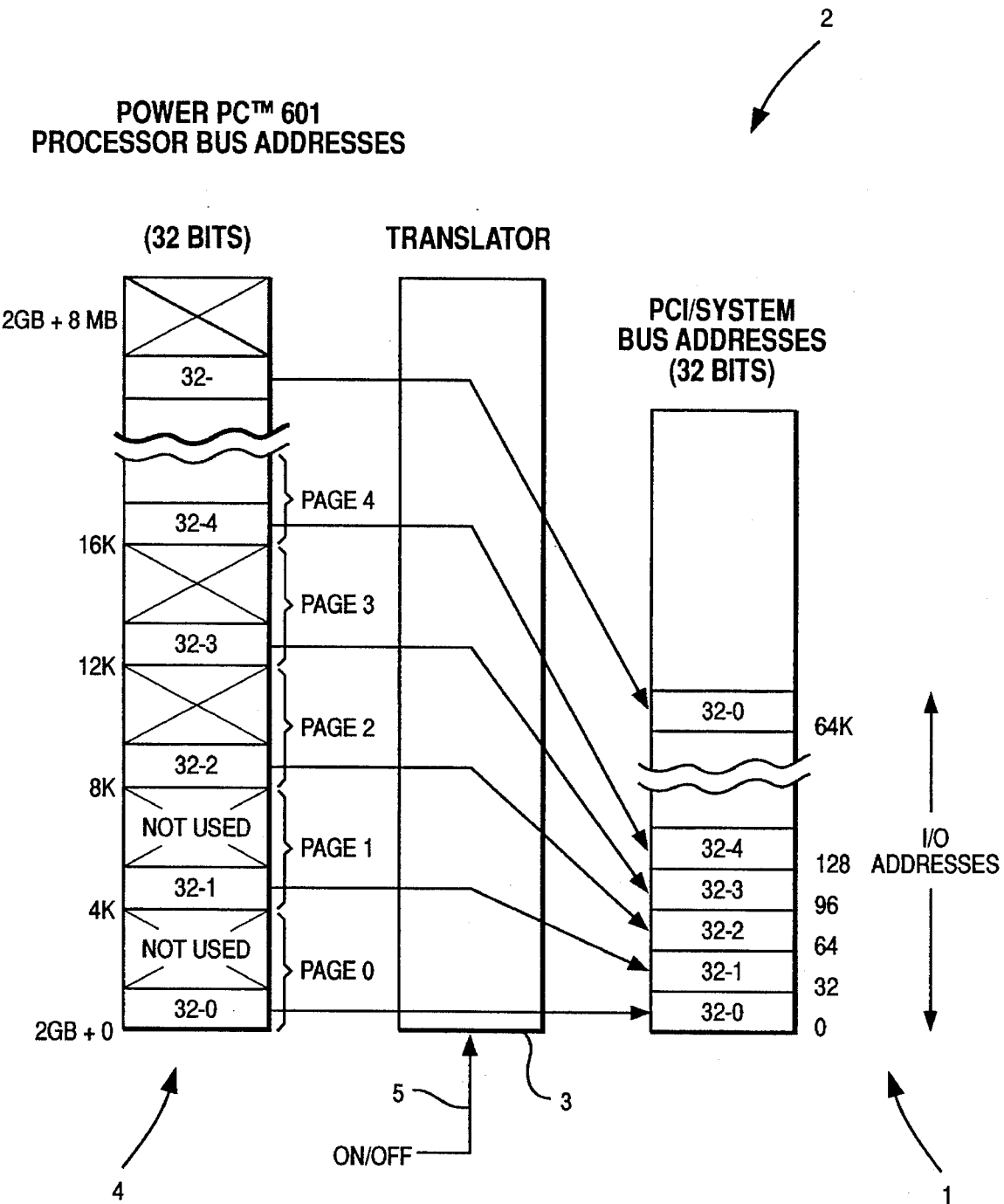
FIG. 1 is a schematic diagram depicting an address translation between non-contiguous processor address space and contiguous I/O address space.

The concept underlying the present invention is depicted by preferred embodiment in FIG. 1. As illustrated in the figure, the I/O addresses, generally at 1, extend in a contiguous band from 0 to 64K bytes of the PCI/System bus address space. To a large extent this is dictated by the fact that the commonly used ISA and EISA buses require 64K of contiguous I/O address space. Mapping according to past practice routinely placed the 64K as a Contiguous block into a slot of the processor bus address space, for example ranging from 2G to 2G+64K. In contrast, the present invention segments the I/O address space into 32 byte increments and maps those increments via translator 3 into respective lower 32 byte segments of multiple 4K pages from within the processor bus address space extending from 2G to 2G+8M of the 32 bit address range available, shown generally at 4. Though only the lower 32 byes of each addressable processor bus page are used, the page access protection mechanism provided in the processor is now directly mappable to a 32 byte increment of I/O addresses. Thereby, the I/O address band of contiguous segments on the PCI bus is mapped to a band of non-contiguous segments of processor bus addresses to utilize access protection available at the processor level by I/O address segment. Translator 3 preferably includes control line 5 for switching between contiguous and non-contiguous mapping of I/O address space depending on the computer system need for access protection.

FIG. 2 depicts the details of the address mapping performed by block 3 (FIG. 1) as preferably implemented between the PowerPC 601 processor bus addresses and the PCI/system bus addresses, each bus having 32 bits, and the final ISA bus used for I/O devices, having only a 16 bit address space.

FIG. 3 illustrates a use of the address mapping to assign protection attributes to 32 byte groups of I/O ports on an ISA bus. In the example, ISA port addresses 0000 through 0001F are translated or mapped to processor addresses 8000 0000 to 8000 001F. The processor addresses 8000 0020 to 8000 0FFF are unused. The ISA I/O port address 0020 starts the next 4K page at the processor address 8000 1000.

Figure 4:
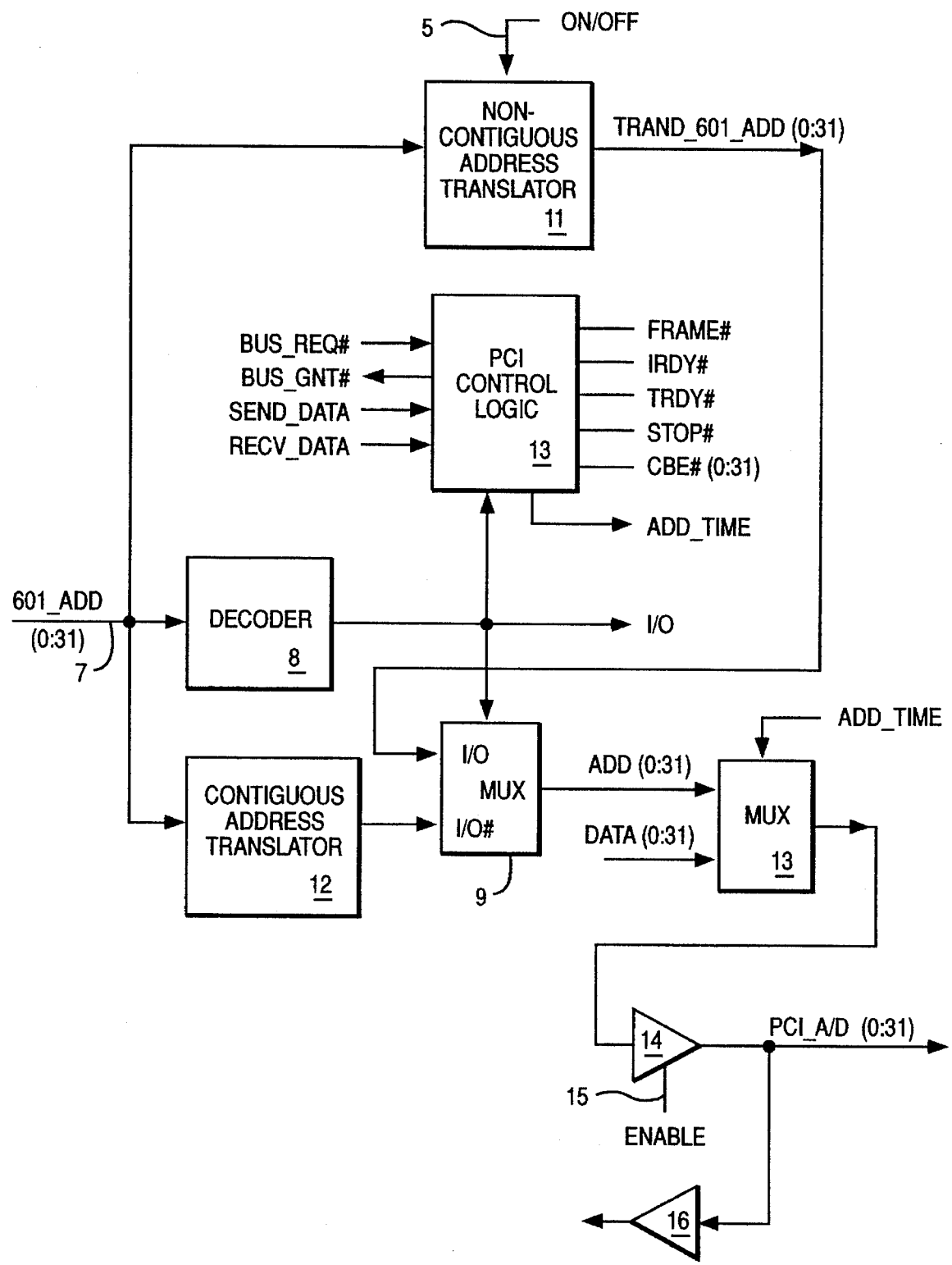
Fig. 4 is a schematic block diagram of a system for selectively translating processor page protected addresses.
Figure 5:
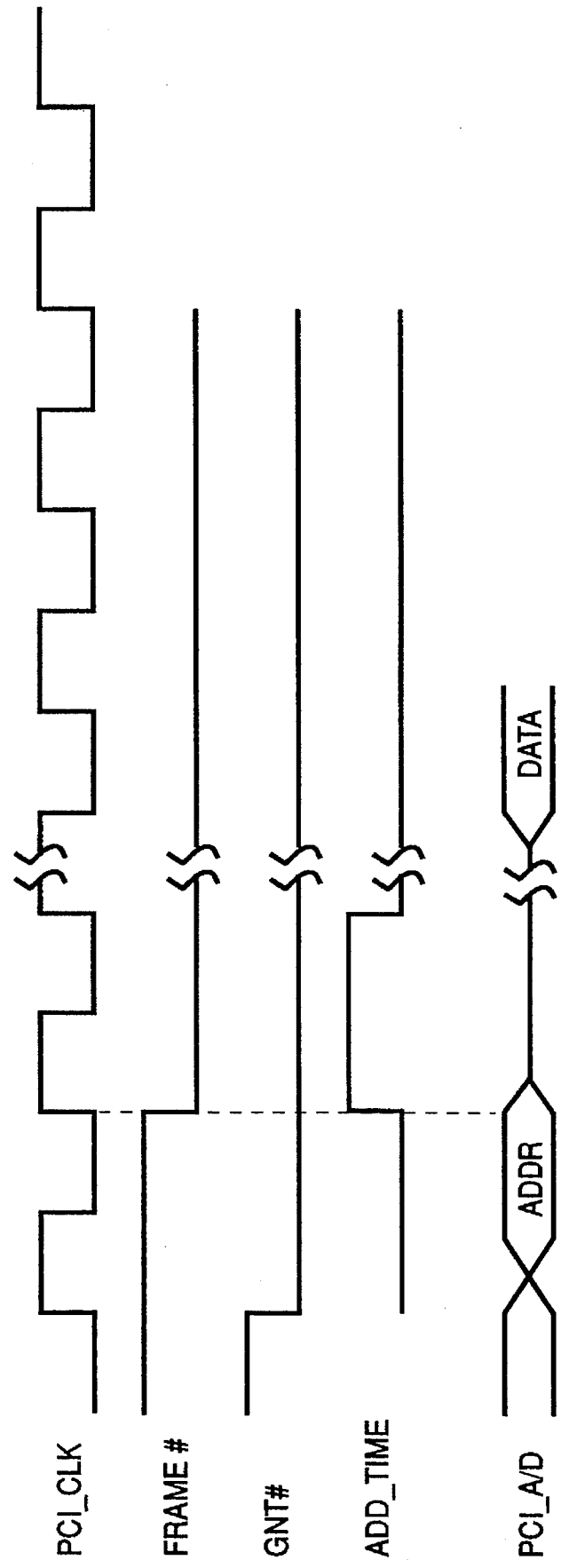
FIG. 5 schematically represents timing signals for the operation of the system in FIG. 4.

FIG. 4 schematically depicts by functional block diagram an embodiment for using page access protection in a processor to protect individual segments within a contiguous I/O address space on a PCI type system bus. PCI control logic 6 represents system functions which create the signals defined by the PCI bus specification. The send Data signals and Receive Data signals are not PCI standard signals, but rather represent functional states initiated by the 601 processor. The only signal special to the present embodiment, is ADD-TIME, a signal which is active high during the first clock after FRAME# activates to indicate that address information should be placed on the PCI-A/D lines. When the processor wants to transmit data to the I/O system, a Send Data signal is transmitted to PCI control logic 6. On the other hand, when the processor wants to receive data from the I/O bus, a Receive Data signal is transmitted to PCI control logic 6. Responsive to the signals, PCI logic 6 generates the earlier noted ADD-TIME signal as defined by the timing diagram in FIG. 5.

The address subject to translation as provided in FIGS. 1 and 2 is received from the 601 processor at input 7. Decoder 8 determines the class or type of the address, distinguishing between an I/O address, a memory address or a configuration address. If decoder 8 detects an I/O address, that information is conveyed to PCI control logic block 6 and multiplexor block 9. Responsive to such I/O address detection, PCI control logic generates control byte enable (CBE) signals to indicate the type of cycle in conventional PCI format to indicate the onset of I/O, memory or configuration cycles. Address translator 11 provides the contiguous to non-contiguous by page translation functionally described with reference to FIGS. 1 and 2. Multiplexor 9 passes the access protected and non-contiguous addresses translated by block 11 when addressing I/O and contiguous translated addresses from translator 12 when not addressing I/O.

The address generated by the 601 processor, either contiguous (for non-protected operations) or non-contiguous (for protected I/O operations), serves as one input to multiplexor 13. The other input to multiplexor 13 is the data which is to be impressed on the PCI bus lines PCI-A/D when the cycle is defined by processor 601 to be a write cycle to the PCI bus. Note that the PCI bus is bi-directional and that it carries both address and data information. The ADD-TIME signal controlling multiplexor 13 is active during the time that an address is to be impressed on the PCI-A/D bus, otherwise data is passed by multiplexor 13. The bi-directional character of the PCI buses is evidenced by by the presence of oppositely direct amplifiers 14 and 16. Enable signal 17 is timed by logic (not shown) to enable the passage of address or data to the PCI-A/D lines as defined in the PCI standard.

The functions provided by the elements in FIG. 4 permit contiguous or non-contiguous translation between processor bus address space and PCI/system bus address space, with a non-contiguous translation providing I/O address space access protection through the page access protection inherent in conventional processors. The concepts however are broader, in that they encompass address space translations between a band in processor address space and a band in a system bus address space, where segments of the band in the system bus address space are non-contiguously proportioned over the band in the processor address space consistent with access protection afforded within the band of the processor address space.

Though the invention has been described and illustrated by way of a specific embodiment, the systems and methods encompassed by the invention should be interpreted in keeping with the breadth of the claims set forth hereinafter.

We claim:

1. In a computer having a processor with processor address space and a system bus with system bus address space, a system bus address space protection system, comprising:

means within the processor for selectively inhibiting access to individual pages or blocks of the processor address space;

means for translating non-contiguous segments in individual pages or blocks of the processor address space into a band of contiguous segments of the system bus address space; and means for preventing access to individually selected segments from the band of contiguous segments of the system bus address space by inhibiting access within the processor to pages or blocks of the processor address space relating to the individually selected segments.

2. The apparatus recited in claim 1, wherein the band of contiguous segments of the system bus address space is I/O address space.

3. The apparatus recited in claim 2, wherein the I/O address space translates into multiple substantially equal segments of the processor address space.

4. The apparatus recited in claim 1, wherein the non-contiguous segments in individual pages or blocks of the processor address space correspond in size.

5. The apparatus recited in claim 4, wherein the processor address space and the system bus address space correspond in size.

6. A computer I/O address space protection system, comprising:

a processor with block or page access protection connected to a processor bus with processor address space comprised of multiple blocks or pages;

system bus with a contiguous I/O address space comprised of multiple segments; and means for translating non-contiguous segments in individual blocks or pages of the processor address space into contiguous segments of the I/O address space.

7. The system recited in claim 6, wherein the non-contiguous segments in individual blocks or pages of the processor address space are substantially equal in size.

8. The system recited in claim 7, wherein the processor bus and the system bus address space correspond in size.

9. In a computer having a processor with processor address space and a system bus with system bus address space, a method of protecting segments of contiguous system bus address space in the computer, comprising the steps of:

operating the processor to provide a page or block protection mode;

translating non-contiguous segments in individual pages or blocks of the processor address space into a band of contiguous segments of the system bus address space and;

selectively preventing access to individual segments from the band of contiguous segments of the system bus address space by selectively enabling the page or block protection mode for pages or blocks of processor address space relating to the individual segments.

10. The method recited in claim 9, wherein the band of contiguous segments of the system bus address space is I/O address space.

11. The method recited in claim 10, wherein the non-contiguous segments in individual pages or blocks of the processor address space correspond in size.

12. The method recited in claim 11, wherein the processor address space and system bus address space correspond in size.

* * * * *